United States Patent Office 3,116,804
Patented Jan. 7, 1964

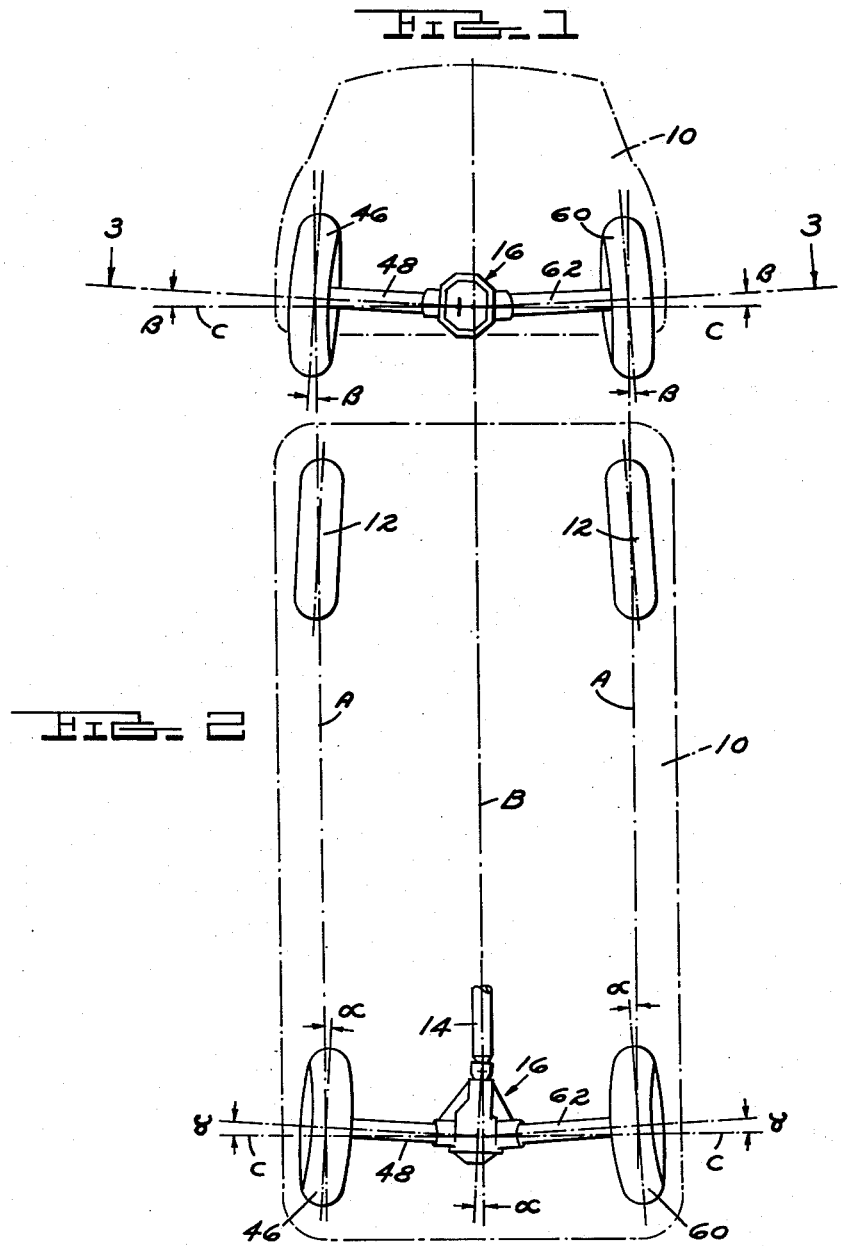

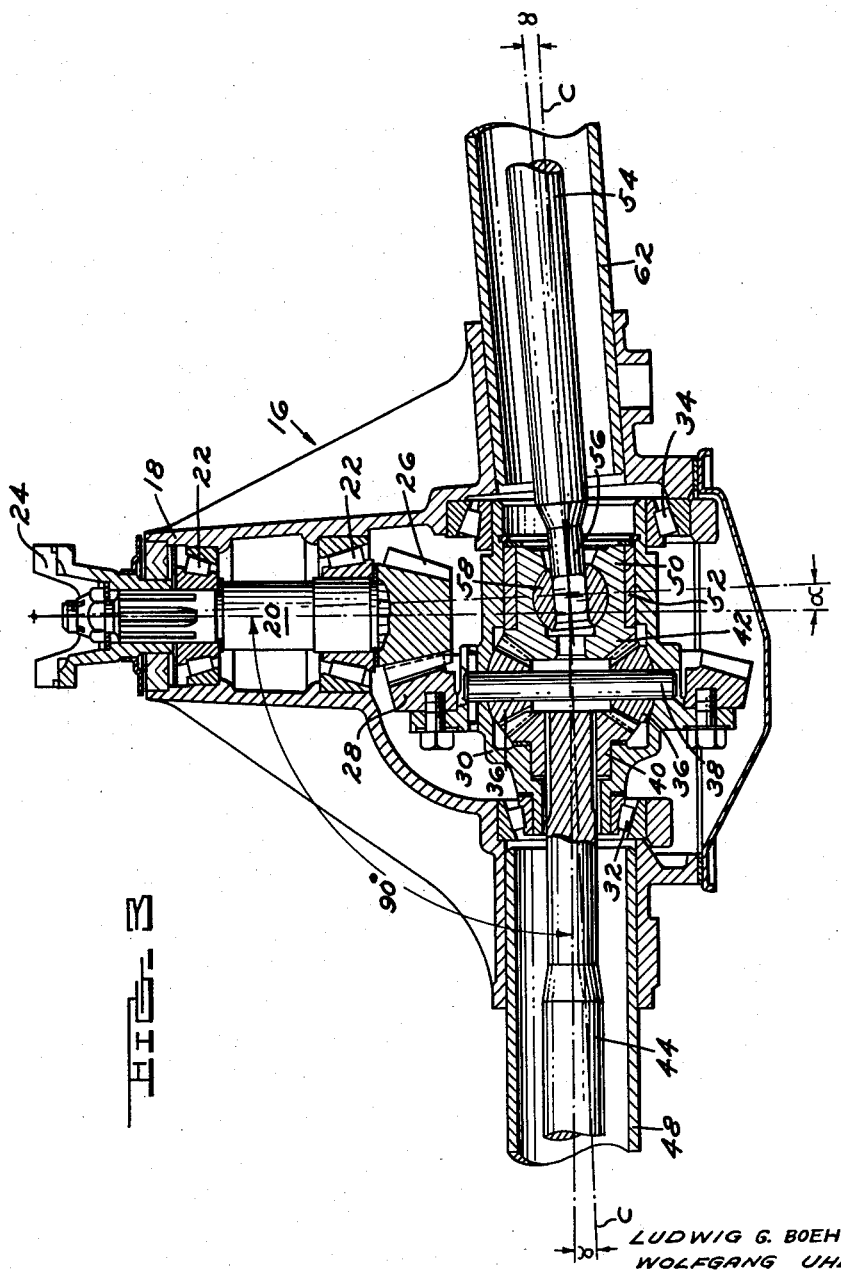

3,116,804
RIGID DRIVEN AXLE FOR MOTOR VEHICLES
Ludwig G. Boehner, Graunschweig, and Wolfgang Uhlmann, Cologne-Rheinkassel, Germany, assignors to Ford Motor Company, Dearborn, Mich., a corporation of Delaware
Filed Jan. 2, 1962, Ser. No. 163,770
Claims priority, application Germany Jan. 11, 1961
2 Claims. (Cl. 180—75)

The present invention relates generally to vehicle drive constructions and more particularly to means for providing camber and toe-in for driving wheels that are interconnected by a rigid axle housing.

The conventional motor vehicle is usually provided with front wheels that are inclined to one another to provide camber and toe-in. Camber and toe-in are also desirable attributes for rear wheels to improve handling and cornering characteristics but are usually not compatible with rigid rear axles.

Therefore, it is the principal object of the present invention to provide, in a vehicle having a rigid rear axle housing, driving wheels that are inclined to each other to have camber and toe-in.

More specifically, it is an object of the present invention to provide a rear drive construction having a differential gear unit with one of its side gears connected to one of the axle shafts by means of a universal joint. This construction permits the axle shafts to be rotatably supported within a rigid axle housing at a fixed camber and toe-in angle.

The objects and advantages of the present invention will be apparent from the following discussion and accompanying drawings in which:

FIGURE 1 is a rear elevational view of a motor vehicle having a rear axle and differential construction in accordance with the present invention;

FIGURE 2 is a top plan view of the vehicle of FIGURE 1; and

FIGURE 3 is a sectional view taken along section lines 3—3 of FIGURE 1.

Referring now to the drawings wherein the presently preferred embodiment of this invention is disclosed, a vehicle 10 is provided with a pair of front wheels 12 that are inclined to vertical longitudinal planes indicated by reference letters A to provide toe-in in a conventional fashion.

The vehicle 10 has a drive shaft 14 that is drivingly connected to a front mounted engine at its forward end and to a differential gear unit 16 at its rear end. The differential 16 includes a housing 18 which rotatably supports a pinion shaft 20 by a span of anti-friction bearings 22. The yoke 24 of a universal joint is splined to the forward end of the pinion shaft 20 and provides a connecting element for joining with the drive shaft 14.

A pinion gear 26 is formed on the rear end of the pinion shaft 20 and meshes with a ring gear 28. The ring gear 28 is bolted to a differential carrier 30 that is rotatably supported within the housing 18 by left and right roller bearings 32 and 34. A pair of differential gears 36 are carried by a shaft 38 rotatably mounted within the carrier 30. The differential gears 36 are in mesh with a pair of bevel side gears 40 and 42.

A left axle shaft 44 has a splined connection at its inner end with the left side gear 40. The outer end of the axle shaft 44 is drivingly connected to a road wheel 46. A tube-like axle housing 48 is rigidly connected to the housing 18 of the differential 16 at its inner end and has a bearing at its outer end which rotatably supports the axle shaft 44.

The right side gear 42 has a body portion 50 integral therewith which is rotatably supported within the carrier 30 by a bushing 52. The bushing 52 and side gear 42 are contained within the carrier 30 by appropriate means such as a snap ring.

Universal joint means are provided to connect a right axle shaft 54 with the body 50 of the side gear 42. The inner end 56 of the axle shaft 54 is reduced in size, provided with a square cross section and rests within an intermediate member 58. Member 58 is positioned within the body 50 of the side gear 42 and is adapted to permit a driving connection between the right axle shaft 54 and the side gear 42 although the axes of rotation of those elements are inclined. Other universal joint constructions may also be used at this point. For example, a pot joint in which a pair of trunnions are carried by the shaft end and engage axial slots in the driving member would be equally appropriate.

A right road wheel 60 is connected to the outer end of the right axle shaft 54. A tube-like axle housing 62 is rigidly secured to the differential housing 18 concentric about the axle shaft 54 and has a bearing at its outer end that supports the axle 54 and wheel 60.

The universal joint between the right side gear 42 and right axle shaft 54 permits the two axle shafts 44 and 54 to be angularly disposed. The left shaft 44 is set at a 90° angle to the axis of the pinion shaft 20. The axis of the pinion shaft 20 is inclined at an angle α to a longitudinal axis B. Therefore, the left and right axle shafts 54 and 44 are both inclined at the same angle α to a transverse line C which passes through the center of the universal joint perpendicular to the longitudinal axis B. Because the wheels 46 and 60 rotate in planes perpendicular to the axes of the axles 44 and 54, the angle α is also the angle at which the wheels 46 and 60 toe-in.

The axle shafts 44 and 54 may also be inclined in elevation by reason of the universal joint. FIGURE 1 illustrates such a geometric arrangement with the shafts 44 and 54 inclined to provide a wheel camber indicated by the angle β.

The differential construction and associated shafting provides a vehicle with a rigid axle housing having driving wheels with both toe-in and camber inclination.

The foregoing description presents the presently preferred embodiment of this invention. Modifications and alternate structures may occur to those skilled in the art that will come within the scope and spirit of the following claims.

We claim:
1. A vehicle having a power delivering drive shaft; a differential assembly having a pinion shaft drivingly connected to said drive shaft; said pinion shaft being inclined in a horizontal direction to a vertical plane through the longitudinal center line of said vehicle; said pinion shaft drivingly engaging a differential gear carrier; said differential carrier containing at least one differential pinion gear enmesh with a pair of side gears; a first axle shaft directly connected to one of said side gears;

said first axle shaft being normal to the axis of said pinion shaft; universal joint means connected to the other of said side gears; a second axle shaft connected to the output of said universal joint means; rigid housing means containing said axle shafts with their axes inclined to one another.

2. A vehicle having a power delivering drive shaft; a differential assembly having a pinion shaft drivingly connected to said drive shaft; said pinion shaft being inclined in a horizontal direction to a vertical plane through the longitudinal center line of said vehicle; said pinion shaft drivingly engaging a differential gear carrier; said differential carrier containing at least one differential pinion gear enmesh with a pair of side gears; a first axle shaft connected to one of said side gears; said first axle shaft being normal to the axis of said pinion shaft; universal joint means connected to the other of said side gears; a second axle shaft connected to the output of said universal joint means; said axle shafts being drivingly connected to road wheels at their outer ends; rigid housing means containing said axle shafts with their axes inclined to one another to provide said wheels with planes of rotation that are inclined to vertical longitudinal planes.

References Cited in the file of this patent

UNITED STATES PATENTS

| | | |
|---|---|---|
| 1,050,049 | Agnelli | Jan. 7, 1913 |
| 2,105,369 | Paton | Jan. 11, 1938 |

FOREIGN PATENTS

| | | |
|---|---|---|
| 352,192 | France | May 24, 1905 |
| 371,718 | France | Jan. 31, 1907 |
| 7,870 | Great Britain | of 1904 |
| 26,272 | Great Britain | of 1906 |
| 859,657 | Great Britain | Jan. 25, 1961 |
| 63,460 | Switzerland | Jan. 9, 1913 |